US008191374B2

(12) United States Patent
Nanataki et al.

(10) Patent No.: US 8,191,374 B2
(45) Date of Patent: Jun. 5, 2012

(54) TWO-SHAFT GAS TURBINE

(75) Inventors: Kenji Nanataki, Hitachi (JP); Hidetaro Murata, Hitachi (JP); Nobuaki Kizuka, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 568 days.

(21) Appl. No.: 12/370,636

(22) Filed: Feb. 13, 2009

(65) Prior Publication Data

US 2009/0223202 A1 Sep. 10, 2009

(30) Foreign Application Priority Data

Mar. 4, 2008 (JP) ................................ 2008-053461

(51) Int. Cl.
*F02C 3/10* (2006.01)
*F01D 5/08* (2006.01)

(52) U.S. Cl. ........................................ 60/806; 415/115

(58) Field of Classification Search .................... 60/806; 415/115
See application file for complete search history.

(56) References Cited

U.S. PATENT DOCUMENTS 4,034,558 A * 7/1977 Korta et al. .................. 415/115
4,079,587 A * 3/1978 Nordstrom et al. ............. 60/791
4,135,362 A * 1/1979 Glenn ........................... 415/115
4,869,640 A * 9/1989 Schwarz et al. .............. 415/115
5,167,485 A * 12/1992 Starkweather ................ 415/115
5,358,374 A 10/1994 Correia et al.
7,025,562 B2 * 4/2006 Imbourg et al. ............... 415/115

FOREIGN PATENT DOCUMENTS

JP 62-029701 2/1987
JP 2001-020705 1/2001
JP 2003-227311 8/2003
JP 2005-009440 1/2005
JP 2005-256607 9/2005

* cited by examiner

*Primary Examiner* — Ted Kim
(74) *Attorney, Agent, or Firm* — Mattingly & Malur, PC

(57) ABSTRACT

The temperature rise of a wheel space between a high-pressure turbine and a low-pressure turbine is suppressed. Cooling air is led from outside a casing 17 to a wheel space via a low-pressure turbine initial stage stator blade 5 and a diaphragm 11. An upstream side space seal portion 41 is adapted to restrict and divide the upstream side space into an outer circumferential portion 25 and an inner circumferential portion 27 and to allow cooling air to the upstream side space outer circumferential portion 27 to blow out into the upstream side space outer circumferential portion 25. Also, a downstream side space seal portion 42 is adapted to restrict and divide the downstream side space into an outer circumferential portion 26 and an inner circumferential portion 28 and to allow cooling air to blow out into the downstream side space outer circumferential portion 26.

3 Claims, 5 Drawing Sheets

TWO-SHAFT GAS TURBINE

BACKGROUND OF THE INVENTION

1. Field of the Invention

The present invention relates to a two-shaft gas turbine having a plurality of rotating shafts.

2. Description of the Related Art

In a two-shaft gas turbine having a plurality of rotating shafts, the respective rotating shafts of a high-pressure turbine and of a low-pressure turbine are isolated by a bulkhead (see JP-A-2005-9440).

SUMMARY OF THE INVENTION

In a two-shaft gas turbine, a wheel space and a gas-path between a high-pressure turbine and a low-pressure turbine are generally isolated by the inner circumferential wall of a low-pressure turbine initial stage stator blade. A gap has to been provided between the stator blade inner circumferential wall as a stationary body and a rotor of the high-pressure turbine or a rotor of the low-pressure turbine as a counterpart rotating body. In general, a windage loss occurs in an area put between the rotating body and the stationary body. The occurring amount of windage loss is increased as the gap between the rotating body and the stationary body is increased or as the circumferential velocity of the rotating body is increased. In a high-speed rotating gas turbine, the circumferential velocity of the high-pressure turbine and of the low-pressure turbine is extremely large at the outer circumferential portion of the wheel space. It is probable, therefore, that a large windage loss may occur at the outer circumferential portion of the wheel space. Thus, high-temperature gas in the gas-path is sucked into the wheel space via the gap between the inner circumferential wall of the low-pressure turbine initial stage stator blade and both the turbine rotors to probably increase temperature on the outer circumferential side of the wheel space. Further, since a seal portion is not present in the wheel space, the movement of fluid from the outer circumferential portion to the rotational center of the turbine cannot structurally be obstructed. Consequently, it is probable that the temperature on the inner circumferential side of the wheel space may rise with the increased temperature on the outer circumferential side thereof.

Accordingly, it is an object of the present invention to provide a two-shaft gas turbine that can suppress an increase in the temperature of a wheel space between a high-pressure turbine and a low-pressure turbine.

To achieve the above object, according to an aspect of the present invention, a seal portion divides into an outer circumferential side and an inner circumferential side each of wheel spaces on the upstream side and downstream side of a bulkhead between a high-pressure turbine and a low-pressure turbine. This makes cooling air be supplied to the inner circumferential side of each of the upstream side and downstream side wheel spaces to form a flow of air flowing toward a gas-path in each of the inner circumferential sides of the upstream side and downstream side wheel spaces.

According to the aspect of the present invention, it is possible to suppress the temperature rise of the wheel space between the high-pressure turbine and the low-pressure turbine.

DESCRIPTION OF THE PREFERRED EMBODIMENTS

Preferred embodiments of the present invention will hereinafter be described with reference to the drawings.

A two-shaft gas turbine has a plurality of turbine rotors in a turbine. Compressed air from a compressor is burned together with fuel in a combustor to produce combustion gas, by which each turbine rotor is rotated to provide rotational power. A high-pressure side turbine rotor is connected to a compressor rotor to drive the compressor. On the other hand, a low-pressure side turbine rotor is connected to load equipment such as a generator, a pump and the like to drive the load equipment. If the low-pressure side turbine rotor is connected to the rotor of the generator, the rotational power obtained by the low-pressure turbine is converted to electric energy. As described above, the provision of the plurality of turbine rotors makes it possible to rotate the compressor, the generator and the like at respective different rotating speeds. Thus, the two-shaft gas turbine can more reduce an energy loss than a one-shaft gas turbine whose turbine rotor is not divided.

[First Embodiment]

Figure 1:
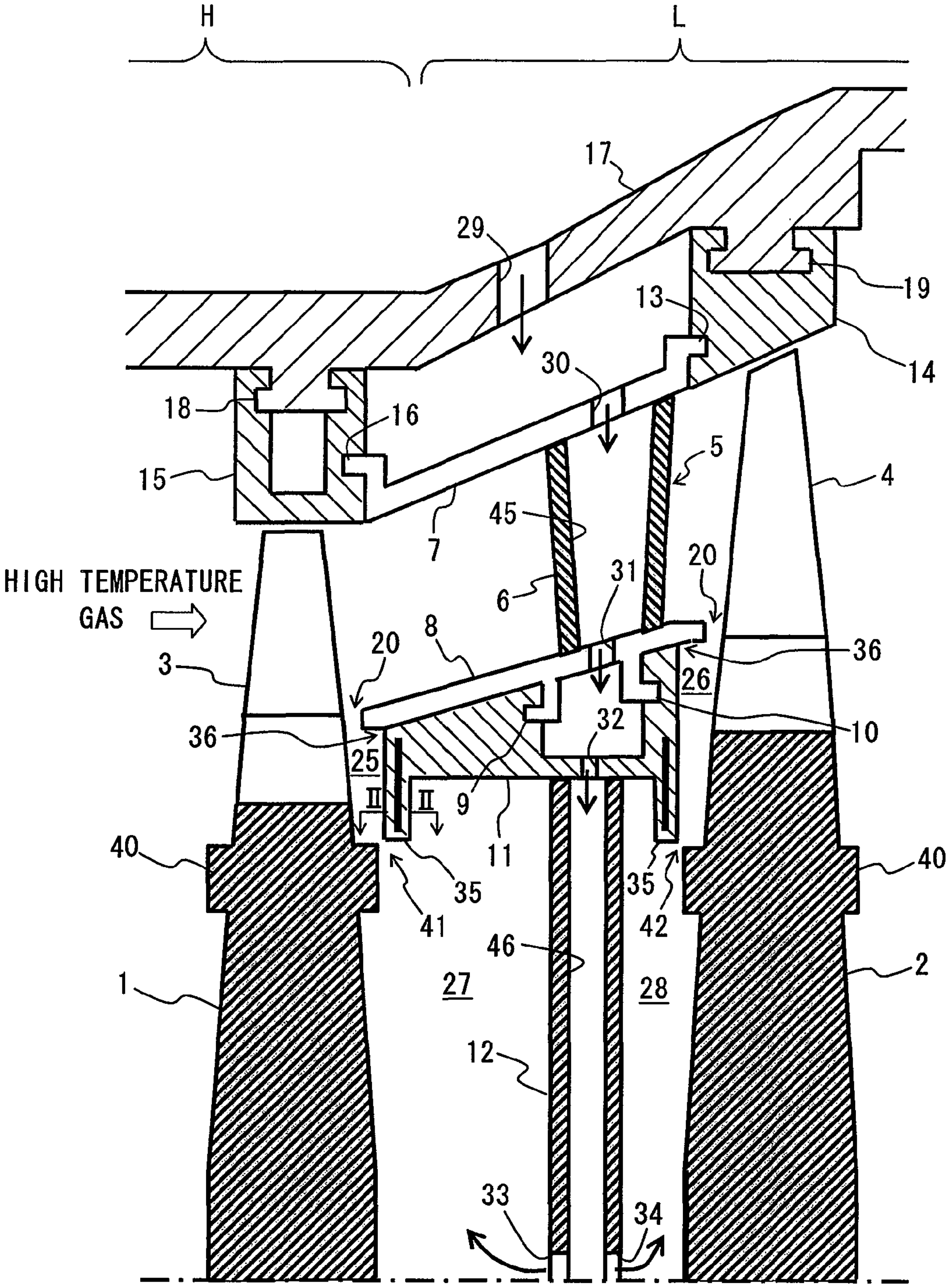
FIG. 1 is a lateral cross-sectional view illustrating an essential part structure of a two-shaft gas turbine according to a first embodiment of the present invention.
Figure 2:
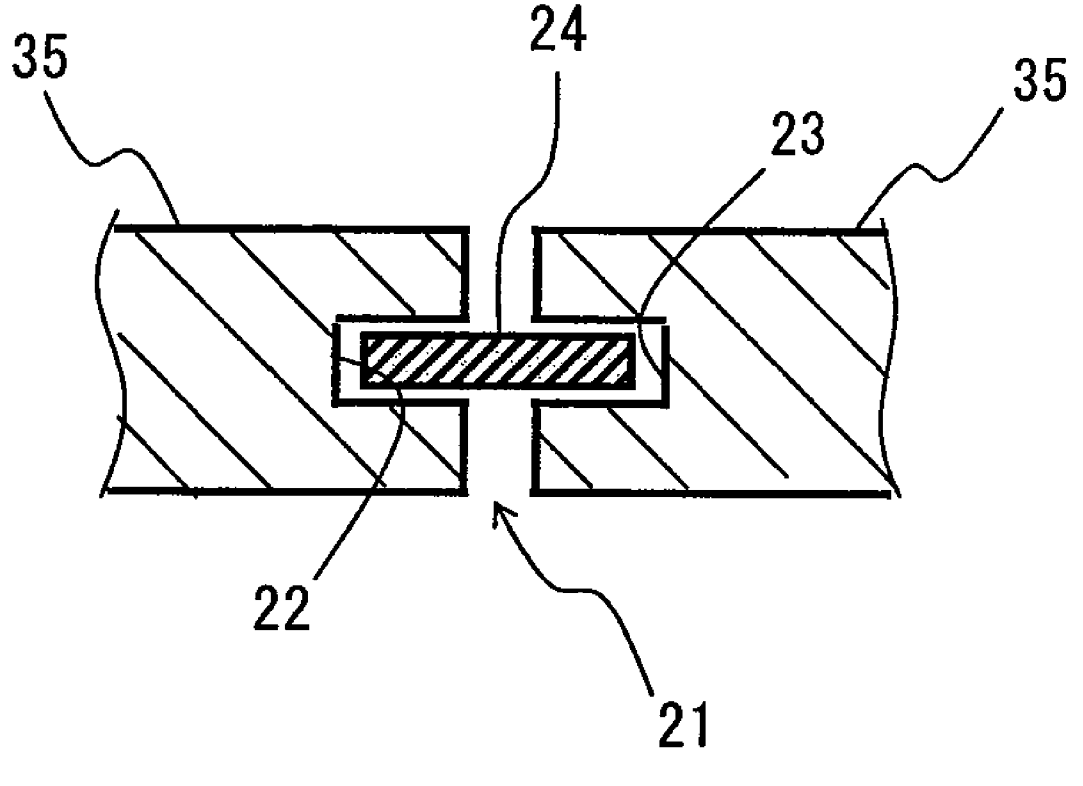
FIG. 2 is a cross-sectional view taken along line II-II of FIG. 1.

FIG. 1 is a lateral cross-sectional view illustrating an essential part structure of a two-shaft gas turbine according to a first embodiment of the present invention, taken along a cross-section including an axial centerline as a rotation center. FIG. 2 is a cross-sectional view taken along line II-II.

Referring to FIGS. 1 and 2, a turbine of the two-shaft gas turbine includes a high-pressure turbine H and a low-pressure turbine L disposed downstream of the high-pressure turbine H. A rotating shaft of the turbine is divided into a high-pressure turbine rotor 1 of the high-pressure turbine H and a low-pressure turbine rotor 2 of the low-pressure turbine L. Each of the high-pressure turbine rotor 1 and the low-pressure turbine rotor 2 are rotated independently. Rotor blades 3 and 4 are attached to the outer circumferential portions of the high-pressure turbine rotor 1 and the low-pressure turbine rotor 2, respectively. The rotor blades 3, 4 face a passage portion (the gas path) in which high-temperature gas, working fluid, from a combustor (not shown) flows. The fluid energy of the high-temperature gas is converted by the rotor blades 3, 4 into rotational energy of the turbine rotors 1, 2 so that the high-pressure turbine H and the low-pressure turbine L each provide rotational power. It is to be noted that FIG. 1 illustrates only a final stage rotor blade 3 of the high-pressure turbine rotor 1 and an initial stage rotor blade 4 of the low-pressure turbine rotor 2.

In order to allow high-pressure gas to flow in the initial stage rotor blade 4 of the low-pressure turbine at an optimal angle, an initial stage stator blade 5 of the low-pressure turbine is installed immediately before the low-pressure turbine initial stage rotor blade 4 (that is, between the high-pressure turbine final stage rotor blade 3 and the low-pressure turbine initial stage rotor blade 4). The low-pressure turbine initial stage stator blade 5 is composed of a blade section 6, an outer circumferential wall 7 on the outer circumferential side of the blade section 6 and an inner circumferential wall 8 on the inner circumferential side of the blade section 6.

Hooks 13 and 16 are provided at the downstream end and upstream end, respectively, of the outer circumferential wall 7 of the low-pressure turbine initial stage stator blade 7. The hook 13 provided at the downstream end of the outer circumferential surface of the outer circumferential wall 7 is fitted to a casing shroud 14 of the low-pressure turbine initial stage. The hook 16 provided at the upstream end of the outer circumferential surface of the outer circumferential wall 7 is fitted to a casing shroud 15 of the high-pressure turbine final stage. In this way, the low-pressure turbine initial stage stator blade 5 is retained on the inner circumferential surfaces of the casing shrouds 14, 15. The casing shrouds 14 and 15 are retained on the inner circumferential surface of a casing 17 by hooks 18 and 19, respectively, provided on the inner circumferential surface of the casing 17.

The inner circumferential wall 8 of the low-pressure turbine initial stage stator blade 5 functions so as to isolate a wheel space from a gas path between turbine rotors 1, 2 formed on the inner circumferential side thereof. However, since the inner circumferential wall 8 of the low-pressure turbine initial stage stator blade 5 is a stationary body, an appropriate gap 20 is interposed between the inner circumferential wall 8 and each of the turbine rotor 1 and the turbine rotor 2 both being rotating bodies. Hooks 9, 10 are provided on the inner circumferential surface of the inner circumferential wall 8. A hollow diaphragm 11 is secured to the inner circumferential portion of the inner circumferential wall 8 so as to be circumferentially fitted to the hooks 9, 10. A gap between the diaphragm 11 and each of the respective wheels of the high-pressure turbine rotor 1 and the low-pressure turbine rotor 2 is set as narrow as possible. A disk-like bulkhead 12 is mounted on the inner circumferential side of the diaphragm 11.

Incidentally, the outer circumferential wall 7 and inner circumferential wall 8 of the stator blade 5 constitute an annular gas-path but are each configured to be circumferentially divided into a plurality of segments. An appropriate gap is interposed between segments to thereby allow thermal expansion during operation. Similarly, the casing shrouds 14, 15, and the diaphragm 11 are each configured to be circumferentially divided into segments. The segments of each of the casing shrouds 14 and 15, the low-pressure turbine initial stage stator blade 5, and the diaphragm 11 are sequentially circumferentially assembled to corresponding one of the casing 17, the casing shrouds 14, 15, and the low-pressure turbine initial stage stator blade 5, respectively. The casing 17 has such a half-split structure as to be split into an upper half and a lower half. When the turbine is assembled, the segments of each of the casing shrouds 14, 15, the low-pressure turbine initial stage stator blade 5, and the diaphragm 11 are assembled to each of the upper half casing and the lower half casing, and then the turbines 1, 2 and the bulkhead 12 are assembled to the lower half stationary body unit. This assembly is put on an upper half stationary body unit.

The bulkhead 12 described earlier is retained in the inner circumferential portion of the diaphragm 11 while being fitted to, e.g., a groove provided in the circumferential surface of the diaphragm 11. The bulkhead 12 is located between the respective wheels of the high-pressure turbine rotor 1 and the low-pressure turbine rotor 2 to separate the wheel space between both the turbine rotors 1, 2 into an upstream side space and a downstream side space. Thus, the high-pressure turbine H is isolated from the low-pressure turbine L to prevent the leak of fluid between the upstream side wheel space and the downstream side wheel space. This ensures an appropriate pressure difference between the high-pressure side wheel space and the low-pressure side wheel space.

In this case, an upstream side space seal portion 41 is provided in the upstream side wheel space. An area cross-section of the upstream side wheel space is restricted by the upstream side space seal portion 41 and divided into an upstream side space outer circumferential portion 25 on the gas-path side and an upstream side space inner circumferential portion 27 on the inside of the upstream side space outer circumferential portion 25. Similarly, a downstream side space seal portion 42 is provided in a downstream side wheel space. An area cross-section of the downstream side wheel space is restricted by the downstream side space seal portion 42 and divided into a downstream side space outer circumferential portion 26 on the gas-path side and a downstream side space inner circumferential portion 28 on the inside of the downstream side space outer circumferential portion 26. The space seal portions 41, 42 are disposed close to the outer circumference in the wheel space. The upstream side and downstream side space outer circumferential portions 25 and 26 are more narrowly partitioned than the upstream side and downstream side space inner circumferential portions 27 and 28, respectively.

The upstream side space seal portion 41 is composed of the diaphragm 11 and a portion, of the final stage wheel of the high-pressure turbine H, opposed to the diaphragm 11. For further explanation, in the high-pressure turbine rotor 1, turbine wheels for all stages are axially stacked and fastened with a plurality of through-bolts (not shown) called stacking bolts. The turbine wheel is provided with bolt insertion portions 40 adapted to receive the through-bolts inserted therethrough. The bolt insertion portion 40 axially protrudes from both sides of the turbine wheel and comes into abutment against a bolt insertion portion 40 of a turbine wheel or a spacer axially adjacent thereto. This increases the rigidity of the portion fastened by the through-bolts. In the high-pressure turbine final stage, the bolt insertion portion 40 on the downstream side of the final stage wheel protrudes toward the upstream side of the wheel space between the low-pressure turbine rotor 2 and the high-pressure turbine rotor 1 as shown in FIG. 1. In the embodiment, a projecting portion (the upstream side projecting portion) 35 extending toward the inner circumferential side is provided at an upstream side portion of the diaphragm 11. A leading end of this projecting portion 35 is located to come close to the bolt insertion portion 40. That is to say, the upstream side projecting portion 35 and the bolt insertion portion 40 which is a portion, of the high-pressure turbine final stage wheel, opposed to the upstream side projecting portion 35 constitute the upstream side space seal portion 41 described earlier. Similarly to the upstream side space seal portion 41, also the downstream side space seal portion 42 described earlier is constituted by a projecting portion (a downstream side projecting portion) 35 provided at a downstream side portion of the diaphragm 11 so as to project toward the inner circumferential side and by a portion (the bolt insertion portion 40 on the upstream side of the initial stage wheel), of the low-pressure turbine initial stage wheel, opposed to the downstream side projecting portion 35.

The casing 17, the outer circumferential wall 7 and inner circumferential wall 8 of the low-pressure turbine initial stage stator blade 5, and the diaphragm 11 are provided with air holes 29, 30, 31, and 32, respectively. A compression air introduction pipe (not shown) adapted to lead air extracted from the compressor (not shown) is connected to the air hole 29 of the casing 17. The blade portion 6 of the low-pressure turbine initial stator 5 and the bulkhead 12 are made hollow and provided with a stator blade-inside passage 45 and a bulkhead-inside passage 46, respectively, both extending toward the rotational center. The bulkhead 12 is provided at a turbine central axial portion with an upstream side central hole 33 on the upstream side and with a downstream side central hole 34 on the downstream side. The bulkhead-inside passage 46 communicates with the upstream side space inner circumferential portion 27 via the upstream side central hole 33 and with the downstream side space inner circumferential portion 28 via the downstream side central hole 34. With this structure, cooling air extracted from, e.g., the compressor (not shown) is led to the periphery of the turbine axis of the wheel space through a cooling air introduction path connected together as follows: the air hole 29→the air hole 30→the stator blade-inside passage 45→the air hole 31→the air hole 32→the bulkhead-inside passage 46→the central holes 33, 34. All the cooling air of the cooling air introduction path, excluding leaking cooling air, is supplied to the wheel space inner circumferential portions 27 and 28 via the central holes 33 and 34, respectively. As described above, the cooling air led by the cooling air introduction path through the low-pressure turbine initial stage-stator blade 5 and the diaphragm 11 blows out into the upstream side space inner circumferential portion 27 and the downstream side space inner circumferential portion 28 via the upper stream side central hole 33 and the lower stream side central hole 34, respectively. As a result, in the embodiment, the upstream side space inner circumferential portion 27 is increased in pressure so that air blows out from the upstream side space inner circumferential portion 27 into the space outer circumferential portion 25 via the upstream side space seal portion 41. Thus, the radially outward flow of air toward the gas-path is formed in the upstream side space seal portion 41. Similarly, the downstream side space inner circumferential portion 28 is increased in pressure so that air blows out from the downstream side space inner circumferential portion 28 into the space outer circumferential portion 26 via the downstream side space seal portion 42. Thus, the radially outward flow of air toward the gas-path is formed in the downstream side space seal portion 42.

Incidentally, in the present embodiment, since the bulkhead 12 is provided with the central holes 33, 34, the upstream side space inner circumferential portion 27 structurally communicates with the downstream side space inner circumferential portion 28 via the central holes 33, 34. However, the bulkhead-inside passage 46 is higher in pressure than the upstream side and downstream side space inner circumferential portions 27, 28; therefore, fluid will not substantially move between both the space inner circumferential portions 27, 28 via the central holes 33, 34. The diaphragm 11 is configured to be circumferentially divided into the plurality of segments as described earlier. As shown in FIG. 2, all the segments 35 are such that segments 35 circumferentially adjacent to each other are formed with respective grooves 22, 23 at opposite surfaces. A seal key 24 is assembled into the grooves 22, 23 so that a gap 21 between the segments 35, 35 is sealed.

Figure 5:
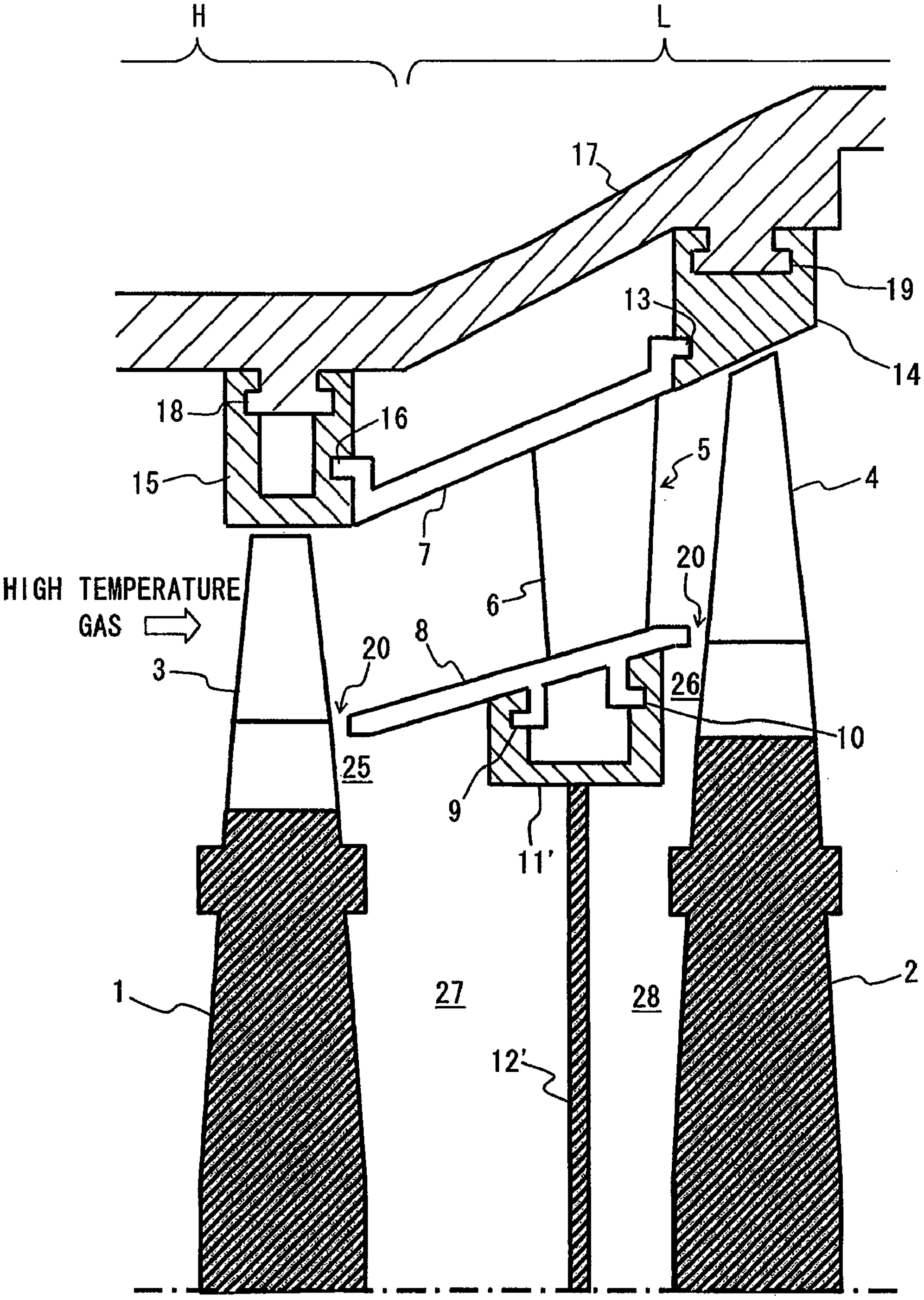
Fig. 5 PRIOR ART
FIG. 5 illustrates a comparative example with respect to the two-shaft gas turbine of the present invention.

Now, for comparison, a configurational example is shown in FIG. 5 in which the upstream side and downstream side space seal portions 41, 42 and the cooling air introduction path are omitted.

In the comparative example of FIG. 5, the cooling air introduction path is omitted, that is, a bulkhead 12' is not provided with the internal passage and the central holes. An interval (a space outer circumferential portion 25 or 26) between a diaphragm 11' and a turbine rotor 1 or 2 is wider than that of the configuration in FIG. 1. Therefore, the pressure of the wheel space is lower than that of the configuration in FIG. 1 and the windage loss of the wheel space is large. Thus, high-temperature gas is sucked into the space outer circumferential portions 25, 26 from the gas-path so that the temperature of the wheel space outer circumferential portions 25, 26 tends to rise. Further, the wheel space outer circumferential portions 25 and 26 are not partitioned from the wheel space inner circumferential portions 27 and 28, respectively, so that a pressure difference therebetween does not virtually occur. Accordingly, the movement of fluid between the wheel space outer circumferential portion 25 and the wheel space inner circumferential portion 27 and between the wheel space outer circumferential portion 26 and the wheel space inner circumferential portion 28 is not obstructed. Thus, the temperature of the wheel space inner circumferential portions 27, 28 may probably rise with the increase in the temperature of the wheel space outer circumferential portions 25, 26.

In contrast to the comparative example, according to the present embodiment, cooling air is supplied to the outer circumferential portions 25, 26 of the wheel space to increase the pressures of the spaces 25, 26. Therefore, it is possible to prevent the high-temperature gas from being sucked into the space outer circumferential portions 25, 26 from the gaps 20 before and behind the inner circumferential wall 8 of the low-pressure turbine initial stage stator blade 5. In addition, the outer circumferential portions 25 and 26 of the wheel space is partitioned from the space inner circumferential portions 27 and 28 by the space seal portions 41 and 42, respectively, to produce a pressure difference (the space inner circumferential portions 27, 28 are higher in pressure). Therefore, it is possible to suppress the movement of fluid from the space outer circumferential portions 25 and 26 of the wheel space to the space inner circumferential portions 27 and 28, respectively, during operation. Thus, even if the temperature of the outer circumferential portions 25, 26 rises, it is possible to prevent the space inner circumferential portions 27, 28 from increasing in temperature due to such an influence.

As described above, in the wheel space between the high-pressure turbine H and the low-pressure turbine L, fluid is caused to wholly radially outwardly flow from the center on both the upstream and downstream sides of the bulkhead 12. This makes it difficult for high-temperature gas to flow in the wheel space from the gas-path and difficult to increase temperature in the wheel space. As the gap between the diaphragm 11 and each of the turbine rotors 1, 2 is narrowed, the windage loss of a corresponding one of the upstream side and downstream side outer circumferential portions 25, 26 is reduced to enable a reduction in the amount of high-temperature gas sucked into the wheel space outer circumferential portions 25, 26.

Stress acting on the various portions of the rotor due to centrifugal force is larger in the inner circumferential portion than in the outer circumferential portion. Therefore, the temperature of the wheel space inner circumferential portions 27, 28 is made lower than that of the wheel space outer circumferential portions 25, 26 to enable an improvement in the reliability of the turbine rotors 1, 2.

In the case where the low-pressure turbine initial stator blade 5 and the diaphragm 11 each has the segment structure as described earlier, it may be probable that leak occurs at the gap between the segments or at the gap 36 between the stator blade inner circumferential wall 8 and the diaphragm 11, or between the bulkhead 12 and the diaphragm 11 to increase the temperature of the air in the cooling air introduction path described above. Also in response to this, in the present embodiment, the gap 21 between the segments of the diaphragm 11 is sealed by the seal key 24 as shown in FIG. 2; therefore, the leak from the gap 21 between the segments is suppressed. As the width and thickness of the grooves 22, 23 are set relatively large with respect to the seal key 24 to ensure the flexibility of the seal key 24 for the grooves 22, 23, it is possible to flexibly deal with also the thermal expansion of the segments of the diaphragm 11. Further, since the increase in the temperature of the inner circumferential portions 27, 28 of the wheel space is suppressed as described above, it is possible to suppress the temperature rise of the air in the bulkhead-inside passage 46 due to leaking cooling air.

[Second Embodiment]

Figure 3:
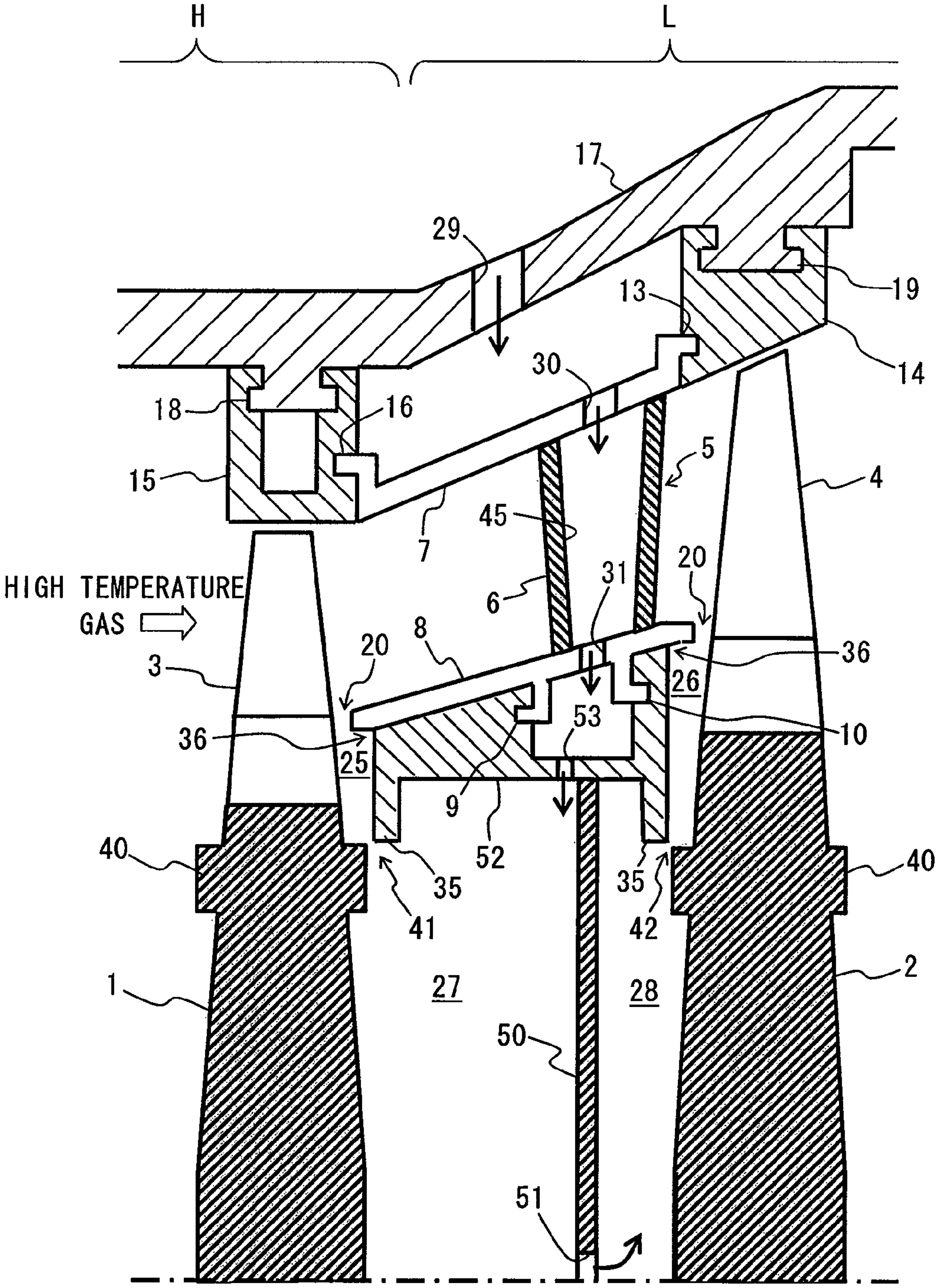
FIG. 3 is a lateral cross-sectional view illustrating an essential part structure of a two-shaft gas turbine according to a second embodiment of the present invention.

FIG. 3 is a lateral cross-sectional view illustrating an essential part structure of a two-shaft gas turbine according to a second embodiment of the present invention. In FIG. 3, the same portions as those of the first embodiment are denoted with the same reference numerals as those of FIG. 1 and their explanations are omitted.

A second embodiment uses a bulkhead 50 of a single structure internally not provided with a passage. The bulkhead 50 is provided at a central portion with a central hole 51 adapted to allow an upstream side space inner circumferential portion 27 to communicate with a downstream side space inner circumferential portion 28. A diaphragm 52 of the embodiment is provided with an air hole 53 opening into the upstream side space inner circumferential portion 27. The full amount, excluding a leaking amount, of cooling air from a cooling air introduction path is supplied to the upstream side space inner circumferential portion 27 via the air hole 53. In the present embodiment, the cooling air from the diaphragm 52 blows out from the air hole 53 into the upstream side space inner circumferential portion 27 as describe above. In addition, cooling air from the upstream side space inner circumferential portion 27 is allowed to blow out into the downstream side space inner circumferential portion 28 via the central hole 51 of the bulkhead 50. The other configurations are the same as those of the first embodiment.

Although the cooling air introduction path is formed to have such a course as described above, since the respective wheel spaces on the upstream side and downstream side of the bulkhead 50 are respectively partitioned by space seal portions 41 and 42, the wheel space inner circumferential portions 27 and 28 are higher in pressure than the wheel space outer circumferential portions 25 and 26, respectively. Thus, the same effect as that of the first embodiment can be provided. In addition, since the bulkhead structure is simple, the configuration of the turbine can be simplified.

[Third Embodiment]

Figure 4:
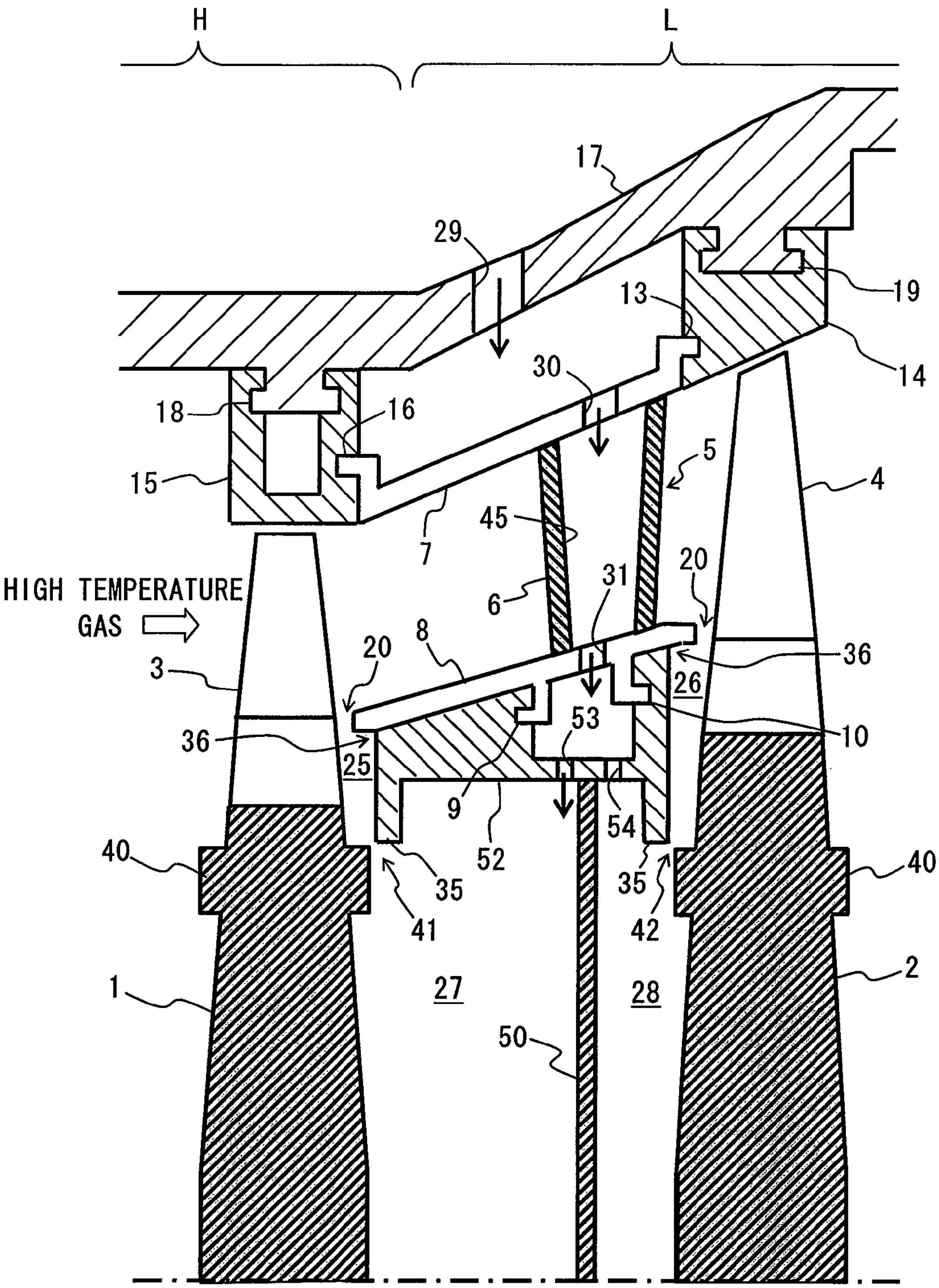
FIG. 4 is a lateral cross-sectional view illustrating an essential part structure of a two-shaft gas turbine according to a third embodiment of the present invention.

FIG. 4 is a lateral cross-sectional view illustrating an essential part structure of a two-shaft gas turbine according to a third embodiment of the present invention. In FIG. 4, the same portions as those of the second embodiment are denoted with the same reference numerals as those of FIG. 3 and their explanations are omitted.

In a third embodiment, an air hole 54 opening into a downstream side space inner circumferential portion 28 is additionally formed in the diaphragm 52 of the second embodiment (FIG. 3) and the central hole 51 of the bulkhead 50 is omitted. A cooling air introduction path is adapted to allow cooling air from the diaphragm 52 to blow out into an upstream side space inner circumferential portion 27 and a downstream side space inner circumferential portion 28 via the air hole (the upstream side air blowing-out hole) 53 and the air hole (the downstream side air blowing-out hole) 54, of the diaphragm 52, respectively. The full amount, excluding a leaking amount, of cooling air from the cooling air introduction path is supplied to the space inner circumferential portions 27 and 28 via the air holes 33 and 34, respectively. The other configurations are the same as those of the second embodiment.

Although the cooling air introduction path is formed to have such a course as described above, since the respective wheel spaces on the upstream side and downstream side of the bulkhead 50 are respectively partitioned by space seal portions 41 and 42, the wheel space inner circumferential portions 27 and 28 are higher in pressure than the wheel space outer circumferential portions 25 and 26, respectively. Thus, the same effect as that of the first embodiment can be provided. Needless to say, since the bulkhead 50 is formed of a single plate without a central hole, also the configuration of the turbine can be simplified. In addition to this, the diaphragm 52 are formed with the air holes 53, 54 so that cooling air from the diaphragm 52 is directly supplied to both the inner circumferential portions 27, 28 of the wheel space. Thus, a merit of facilitating the adjustment of an amount of cooling air is provided.

Incidentally, in the first through third embodiments, the diaphragms 11, 52 are each provided with the projecting portion 35, which is brought close to the space seal portion or 42. However, without provision of the projecting portion 35, the diaphragm may be sized to come close to the high-pressure turbine final stage wheel and to the low-pressure turbine initial stage wheel to form the upstream and downstream side space seal portions 41, 42.

What is claimed is:

1. A two-shaft gas turbine comprising:

a high-pressure turbine;

a low-pressure turbine disposed on the downstream side of said high-pressure turbine;

a diaphragm secured to an inner circumferential side of an initial stage stator blade of said low-pressure turbine;

a bulkhead retained on an inner circumferential side of said diaphragm and located between respective wheels of said low-pressure turbine and of said high-pressure turbine to separate a wheel space between both said high-pressure and low-pressure turbines into an upstream side space and a downstream side space;

a cooling air introduction path adapted to lead cooling air from the outside of a casing to the wheel space via the initial stage stator blade of said low-pressure turbine and via said diaphragm;

an upstream side space seal portion adapted to restrict and divide the upstream side space into an upstream side space outer circumferential portion on a gas-path side and an upstream side space inner circumferential portion on the inside thereof, and to allow cooling air led from said cooling air introduction path to the upstream side space inner circumferential portion to blow out into the upstream side space outer circumferential portion to form a radially outward flow of air in the upstream side space outer circumferential portion; and a downstream side space seal portion adapted to restrict and divide the downstream side space into an downstream side space outer circumferential portion on a gas-path side and a downstream side space inner circumferential portion on the inside thereof and to allow cooling air led from said cooling air introduction path to the downstream side space inner circumferential portion to blow out into the downstream side space outer circumferential portion to form a radially outward flow of air in the downstream side space outer circumferential portion;

wherein said bulkhead includes a bulkhead-inside passage extending from the diaphragm to a turbine central axis;

an upstream side central hole adapted to allow the bulkhead-inside passage to communicate with the upstream side space inner circumferential portion at the turbine central axis; and a downstream side central hole adapted to allow the bulkhead-inside passage to communicate with the downstream side space inner circumferential portion at the turbine central axis;

wherein said diaphragm has an air hole connected to the bulkhead-inside passage; a projecting portion on the upstream side of said bulkhead, the projecting portion being in close to a final stage wheel of said high-pressure turbine; and another projecting portion on the downstream side of said bulkhead, the projecting portion being in close to an initial stage wheel of said low-pressure turbine;

wherein said upstream side space seal portion is composed of the upstream side projecting portion and a portion, of the final stage wheel of said high-pressure turbine, opposed to the upstream side projecting portion;

wherein said downstream side space seal portion is composed of the downstream side projecting portion and a portion, of the initial stage wheel of said low-pressure turbine, opposed to the downstream side projecting portion;

wherein said cooling air introduction path adapted to lead cooling air from said diaphragm to the turbine central axis via the bulkhead-inside passage and allow the cooling air to blow out into the upstream side space inner circumferential portion via the upstream side central hole and the downstream side central hole, respectively; and wherein said cooling air introduction path is higher in pressure than the upstream side space inner circumferential portion and the downstream side space inner circumferential portion, shuts off the movement of air between the upstream side space inner circumferential portion and the downstream side space inner circumferential portion via the upstream side central hole and the downstream side central hole, and ensures a pressure difference between the high pressure side wheel space and the low-pressure side wheel space.

2. The two-shaft gas turbine according to claim 1, wherein the initial stage stator blade of said low-pressure turbine and said diaphragm are each circumferentially divided into a plurality of segments.

3. The two-shaft gas turbine according to claim 2, wherein said diaphragm is such that segments circumferentially adjacent to each other are formed with respective grooves at opposite surfaces and a seal key is assembled into the grooves to seal a gap between the segments.

* * * * *